(12) United States Patent
Vaello Paños et al.

(10) Patent No.: US 11,562,582 B2
(45) Date of Patent: Jan. 24, 2023

(54) THREE DIMENSIONAL IMAGING WITH INTENSITY INFORMATION

(71) Applicant: ams International AG, Jona (CH)

(72) Inventors: Miguel Bruno Vaello Paños, Eindhoven (NL); Daniele Perenzoni, Eindhoven (NL); David Stoppa, Eindhoven (NL); Radoslaw Marcin Gancarz, Eindhoven (NL)

(73) Assignee: AMS INTERNATIONAL AG, Rapperswil (CH)

( * ) Notice: Subject to any disclaimer, the term of this patent is extended or adjusted under 35 U.S.C. 154(b) by 0 days.

(21) Appl. No.: 17/299,129

(22) PCT Filed: Dec. 3, 2019

(86) PCT No.: PCT/EP2019/083420
§ 371 (c)(1),
(2) Date: Jun. 2, 2021

(87) PCT Pub. No.: WO2020/115016
PCT Pub. Date: Jun. 11, 2020

(65) Prior Publication Data
US 2022/0004739 A1 Jan. 6, 2022

Related U.S. Application Data

(60) Provisional application No. 62/878,813, filed on Jul. 26, 2019, provisional application No. 62/774,628, filed on Dec. 3, 2018.

(51) Int. Cl.
*G06V 20/64* (2022.01)
*H04N 13/207* (2018.01)
(Continued)

(52) U.S. Cl.
CPC ............ *G06V 20/64* (2022.01); *G01S 7/4802* (2013.01); *G01S 17/894* (2020.01);
(Continued)

(58) Field of Classification Search
USPC .......................................... 348/46
See application file for complete search history.

(56) References Cited

U.S. PATENT DOCUMENTS

2005/0047636 A1* 3/2005 Gines .................... G06T 11/005
378/4
2009/0273717 A1 11/2009 Masaoka et al.
(Continued)

FOREIGN PATENT DOCUMENTS

WO WO-2020085525 A1 * 4/2020 ............. G01S 17/36

OTHER PUBLICATIONS

International Search Report for Application No. PCT/EP2019/083420 dated Feb. 11, 2020.

*Primary Examiner* — Behrooz M Senfi
(74) *Attorney, Agent, or Firm* — Viering, Jentschura & Partner mbB (57) ABSTRACT

A method for operating a time-of-flight sensor system includes by an array of pixels of a time-of-flight sensor of the time-of-flight sensor system, generating signal data representative of reflected light from an environment; generating an intensity representation of an object in the environment based on the signal data representative of the reflected light from the environment; determining that the intensity representation indicates that an object in the environment includes a target object; and responsive to the determining, generating a three-dimensional representation of the environment based on the data representative of the reflected light.

18 Claims, 6 Drawing Sheets

(51) Int. Cl.
 *H04N 13/254* (2018.01)
 *G01S 17/894* (2020.01)
 *G01S 7/48* (2006.01)

(52) U.S. Cl.
 CPC ......... *H04N 13/207* (2018.05); *H04N 13/254* (2018.05); *G06V 2201/121* (2022.01)

(56) References Cited

U.S. PATENT DOCUMENTS

| | | |
|---|---|---|
| 2012/0039525 A1 | 2/2012 | Tian et al. |
| 2012/0169848 A1* | 7/2012 | Bae .................. H04N 13/254 348/222.1 |
| 2015/0130903 A1* | 5/2015 | Thompson .............. H01S 5/042 372/38.07 |
| 2018/0059218 A1* | 3/2018 | Buettgen ................ G01S 17/04 |
| 2019/0291743 A1* | 9/2019 | Druml .................... G01S 7/497 |

\* cited by examiner

THREE DIMENSIONAL IMAGING WITH INTENSITY INFORMATION

RELATED APPLICATIONS

The present invention is a U.S. National Stage under 35 USC 371 patent application, claiming priority to Serial No. PCT/EP2019/083420, filed on 3 Dec. 2019; which claims priority of U.S. Provisional Application Ser. No. 62/774,628, filed on 3 Dec. 2018; and U.S. Provisional Application Ser. No. 62/878,813, filed on 26 Jul. 2019, the entirety of which are incorporated herein by reference.

BACKGROUND

Three-dimensional (3D) imaging enables a depth representation of a scene to be captured. 3D sensing systems, such as time-of-flight (ToF) systems, employ an illumination source, e.g., in the infrared, and a sensor. The illumination source of a 3D sensing system can be a modulated illumination source with dedicated pixels, such as lock-in pixels or single photon avalanche diodes. The modulation frequency or pulse length for the illumination can depend on factors such as the distance range and the desired precision of the resulting image, and can range as high as several hundred megahertz (for the modulation frequency) or as short as several picoseconds (for the pulse length).

SUMMARY

In an aspect, a method for operating a time-of-flight sensor system includes by an array of pixels of a time-of-flight sensor of the time-of-flight sensor system, generating signal data representative of reflected light from an environment; generating an intensity representation of an object in the environment based on the signal data representative of the reflected light from the environment; determining that the intensity representation indicates that an object in the environment includes a target object; and responsive to the determining, generating a three-dimensional representation of the environment based on the data representative of the reflected light.

Embodiments can include one or more of the following features.

Generating the three-dimensional representation of the environment includes demodulating the data representative of the reflected light.

The generation of the intensity representation of the environment uses less power than the generation of the three-dimensional representation of the environment.

The method includes by processing circuitry of the time-of-flight sensor, determining that an object is present in the environment. The method includes generating the intensity representation responsive to determining that an object is present in the environment. The signal data includes first image data having a first resolution. Determining that an object is present in the environment includes: generating a second image data based on the first image data, the second image data having a second resolution less than the first resolution; and determining that the second image data indicates that an object is present in the environment.

Generating an intensity representation includes generating a two-dimensional representation of the environment.

Determining that the intensity representation indicates that the object includes the target object includes performing an object recognition process.

The method includes illuminating the environment with modulated illumination light. When the environment has a light level below a threshold, including illuminating the environment with light of low frequency modulation. The method includes synchronizing the operation of the time-of-flight sensor with the modulation of the illumination light.

In an aspect, a time-of-flight sensor system includes an time-of-flight sensor including an array of pixels configured to generate signal data representative of reflected light from an environment, and one or more processors configured to: generate an intensity representation of an object in the environment based on the signal data representative of the reflected light from the environment, determine that the intensity representation indicates that the object is present in the environment includes a target object; and generate a three-dimensional representation of the environment based on the signal data representative of the reflected light.

Embodiments can include one or more of the following features.

The system includes an illumination device configured to illuminate the environment with modulated illumination light. The system includes an illumination driver configured to control operation of the illumination device.

Generating an intensity representation includes generating a two-dimensional representation of the environment. The signal data include first image data having a first resolution. The system includes processing circuitry of the time-of-flight sensor, the processing circuitry being configured to: generate second image data based on the first image data, the second image data having a second resolution less than the first resolution; and determine that the second image data indicates that an object is present in the environment.

In an aspect, a mobile device or a vehicle includes a system having one or more of the foregoing features.

The approaches described here can have one or more of the following advantages. The 3D sensor systems described here can be operated in a power efficient manner, e.g., conserving battery life of devices with which the 3D sensor systems are integrated. Detecting the presence of an object of interest by operating an imaging sensor in intensity mode can help to conserve power, e.g., by enabling the imaging sensor to be operated in a higher power depth mode only when an object of interest is determined to be present. The ability to capture both intensity and depth information about an environment can enable the generation of enriched 3D representations of the environment that include both depth and intensity information, e.g., which can be useful for higher security facial recognition processes.

The details of one or more embodiments of the invention are set forth in the accompanying drawings and the description below. Other features, objects, and advantages of the invention will be apparent from the description and drawings, and from the claims.

DETAILED DESCRIPTION

We describe here a three-dimensional (3D) sensor system for generation of 3D representations, e.g., images, of objects in an environment. The 3D sensor system includes an imaging sensor, such as a time-of-flight sensor, that generates signals based on light reflected from the environment. In the 3D sensor systems described here, the imaging sensor can generate intensity signals, depth signals, or both. In some examples, the imaging sensor can be operated initially in an intensity mode, e.g., such that a basic object recognition algorithm can be performed to determine the presence of an object of interest (such as a face) in the environment. When an object of interest is determined to be present, the imaging sensor can be operated to generate depth signals, e.g., a 3D representation of the object of interest, e.g., for facial recognition. Such two-stage operation can help conserve power.

Figure 1:
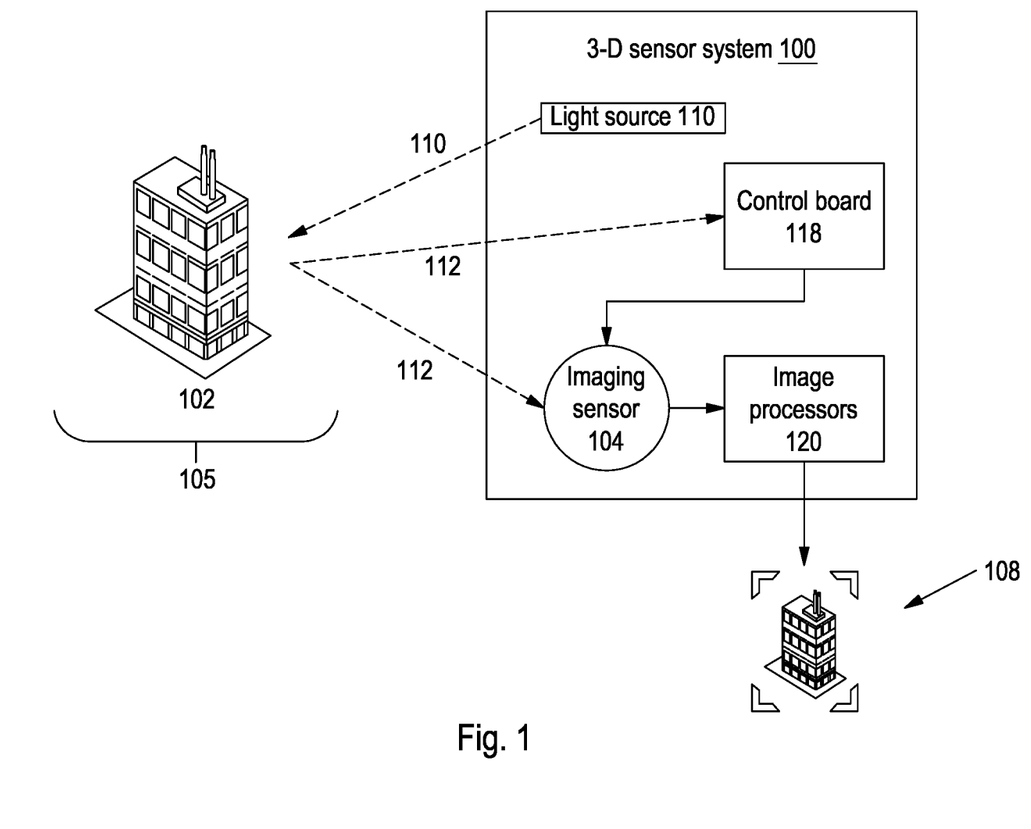
FIG. 1 is a diagram of a 3D sensor system.

Referring to FIG. 1, an example 3D sensor system 100 employs time-of-flight (ToF) sensing to generate a 3D image of an object 102 (in this example, a face) in an environment 105 of the 3D sensor system 100. The 3D measurement system 100 includes an imaging sensor 104 that includes an array (e.g., a two-dimensional (2-D) array) of demodulation pixels.

The object 102 is illuminated with modulated illumination light 111 from a light source 110, such as a laser. For instance, the light 108 can be infrared (IR) light. Some of the illumination light is reflected by the object. The reflected light 112 is detected by the imaging sensor 104.

Each demodulation pixel of the imaging sensor 104 is capable of demodulating the received light signal 112. A control unit 118 is configured to regulate the timing of the imaging sensor 104. The phase values of all pixels of the imaging sensor 104 correspond to distance information R for a corresponding point in the environment 105, e.g., on the building 102. The distance information from the pixels, in combination with a 2D image of the environment obtained by the imaging sensor 104, are converted into a 3D image 122 of the environment 105 by one or more image processors 120. The image 122 can be displayed to a user, e.g., on a display of a computing device such as a mobile device, or can be used as a machine vision input.

In some examples, the modulated illumination light can be pulse intensity modulated light, and the demodulation of the reflected light can deliver the time of flight value directly. In some examples, the modulated illumination light can be continuously intensity modulated light, and the demodulation of the reflected light can deliver the phase delay (P) between the emitted light and the reflected light. The phase delay corresponds to the distance R as follows:

$$R = \frac{P \cdot c}{4\pi f_{mod}},$$

where $f_{mod}$ is the modulation frequency of the illumination light, which can range from, e.g., a few MHz up to several GHz.

The distance information R for each pixel can be calculated as:

$$R = \frac{c \cdot ToF}{2},$$

where c is the speed of light and ToF is the time of flight, which is the elapsed time between emission of light from the light source 110 and detection of the reflected light by the imaging sensor 104. With each demodulation pixel being capable of demodulating the reflected light concurrently, the imaging sensor 104 can deliver 3D images in substantially real time, e.g., frame rates of up to 30 Hz or greater than 30 Hz. Increased lateral transfer time of the photogenerated charge carriers in the demodulated pixels can contribute to high frequency image delivery.

In some examples, the imaging sensor 104 can operate in each of multiple modes, including a depth mode and an intensity mode. In the depth mode, the pixels of the imaging sensor 104 demodulate the reflected, modulated illumination light to generate signals indicative of depth (e.g., distance) in the environment, e.g., signals for generation of a 3D representation of the environment. In the intensity mode, the imaging sensor 104 can generate signals indicative of the intensity of the reflected light. For instance, for the generation of intensity signals, the imaging sensor 104 can operate in a static or semi-static mode in which the reflected light is not demodulated. By static or semi-static operation, we mean that the pixels of the imaging sensor allow a single readout per exposure that is substantially synchronized with the illumination frequency.

In some examples, operation of the imaging sensor 104 in both depth mode and intensity mode can enhance the quality of the 3D representation of the environment. For instance, the ability to take into account both depth information (from depth mode) and intensity information (from intensity mode) can enhance the performance of systems such as facial recognition or object recognition systems by incorporating additional image characteristics.

In some examples, the imaging sensor 104 can be operated in a two-stage process to reduce the power consumption of the 3D sensor system 100. Operation of the imaging sensor 104 in intensity mode is a lower power process than operation of the imaging sensor 104 in depth mode. The imaging sensor 104 can be operated in intensity mode to detect the presence of an object, e.g., an object of interest, in the environment. If an object, e.g., an object of interest, is detected by intensity mode operation, the imaging sensor 104 can then be operated in depth mode for generation of a 3D representation of the object. Such a two-stage process can be employed, e.g., in a facial recognition system, in which intensity mode is used to determine that a face is present in the environment and then depth mode is used to generate a 3D representation of the face for facial recognition processing.

Figure 2:
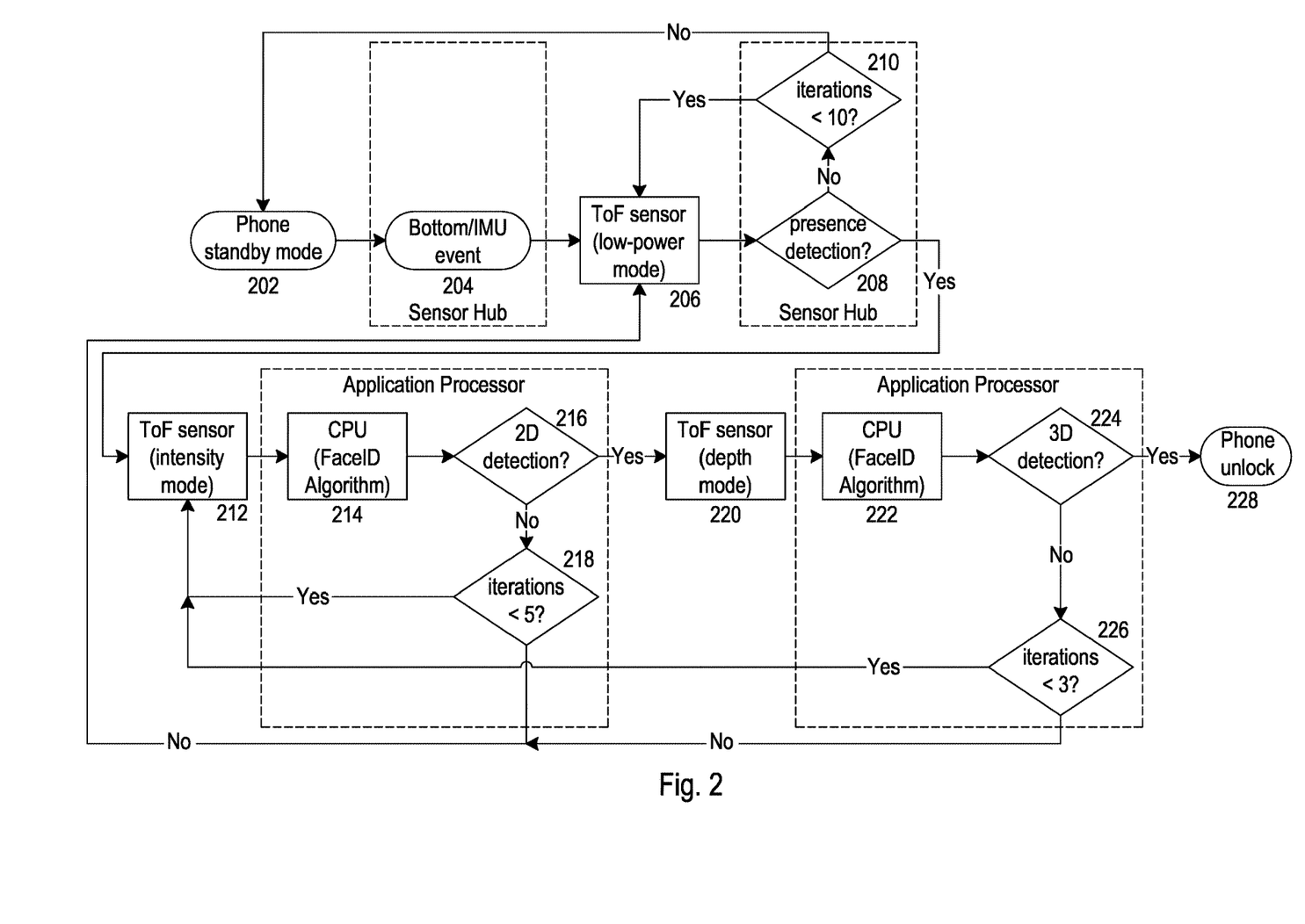
FIG. 2 is a flow chart of a method for using a 3D sensor system.

FIG. 2 shows a method for facial recognition using a two-stage operation of an imaging sensor of a 3D sensor system integrated with a mobile computing device. The method is used to reduce power consumption of the 3D sensor system by initially determining the presence of an object, such as an object of interest, in the environment of the 3D sensor system, by operating the imaging sensor in a lower power intensity mode. If the results of the intensity mode operation indicate that an object, e.g., an object of interest, is present, then the 3D sensor system is operated with the imaging sensor in depth mode for generation of a 3D representation of the object. Operation of the imaging sensor in depth mode can consume a large amount of power.

By having a first, lower power presence detection step, the 3D sensor system can be operated in a more power efficient manner. For instance, the 3D sensor system can trigger operation of the imaging sensor in depth mode only when an object, e.g., an object of interest, is determined to be present. Although FIG. 2 is described with respect to a mobile computing device, other types of devices incorporating 3D sensor systems can also carry out the method of FIG. 2 or similar methods.

At the start of the method of FIG. 2, the mobile computing device (e.g., a cell phone, tablet, or other type of mobile computing device) is in standby mode 202, for example, temporarily locked or asleep. In the example of FIG. 2, an event occurs 204 in which a user indicates that he/she desires an unlocked mobile computing device. For example, the user may shake the mobile computing device or press a button on the mobile computing device. In some examples, the method can proceed without the occurrence of such an event.

In some examples, in response to the occurrence of the event, the 3D sensor system of the mobile computing device is activated in a low power presence detection mode 206. In the low power presence detection mode 206, the 3D sensor system illuminates the environment of the mobile computing device, and the imaging sensor of the 3D sensor system detects light reflected from the environment. Low-resolution image data are generated based on the reflected light and processed in a low power detection mode, e.g., by processing circuitry of the 3D sensor system, to determine whether the low-resolution image data are indicative of the presence of an object in the environment (208). For instance, the presence determination can be based on the distance between an object in the environment and the imaging sensor satisfying a threshold.

In some examples, the low power presence detection mode 206 can be based on a signal from fewer than all of the pixels of the imaging sensor, such as a single pixel or a set of adjacent pixels.

In some examples, if the low-resolution image data do not indicate the presence of an object, the low power presence detection mode repeats the presence detection process 206 for one or more additional iterations 210. In the example of FIG. 2, the low power presence detection mode repeats the presence detection process 206 for 10 iterations 210. On the last (e.g., tenth) iteration, if no object has been detected in the environment, the mobile device returns to standby mode 202. In some examples, if the second image data do not indicate the presence of an object after only a single iteration, the presence detection process ends and the mobile device returns to standby mode 202.

Additional description of low-resolution presence detection mode is provided in U.S. Provisional Application Ser. No. 62/862,881, filed on Jun. 18, 2019, the contents of which are incorporated here by reference in their entirety.

In the example of FIG. 2, when the presence detection process 206 determines that the low-resolution image data indicate that an object is present in the environment, the imaging sensor is operated in intensity mode 212. In some examples, the presence detection process 206 is not carried out and the first operation upon awakening the mobile device out of standby mode is the operation of the imaging sensor in intensity mode 212.

In intensity mode 212, the environment of the 3D sensor system is illuminated and the imaging sensor generates signals indicative of the intensity of the light reflected from the environment (referred to here as intensity data). In some examples, the environment can be illuminated with modulated illumination light, and the imaging sensor can be operated statically or semi-statically such that the reflected light is not modulated.

The intensity data are processed by one or more processors (214), such as processors of the mobile computing device, e.g., application specific integrated circuits (ASICs). The one or more processors perform an image data processing algorithm 216 based on the intensity data. In the example of FIG. 2, the image data processing algorithm 216 is an algorithm that determines whether an object that is present in the environment is, or is likely to be, a face. In some examples, the image data processing algorithm can process the intensity data to determine whether an object that is present in the environment is, or is likely to be, another type of object of interest.

In some examples, if based on the intensity data, an object of interest is not determined to be present, the intensity mode stage 212 of operation of the image sensor is repeated for one or more additional iterations 218. In the example of FIG. 2, the intensity mode stage 212 is repeated for five iterations 218. On the last (e.g., fifth) iteration, if no object of interest has been determined to be present in the environment, the low power presence detection mode 206 is resumed (as shown), or the mobile computing device is returned to standby mode 202. In some examples, the intensity based object recognition process proceeds for only a single iteration, and if no object of interest is determined to be present in the environment, the intensity mode stage 212 ends, e.g., low power presence detection mode 206 is resumed or the mobile computing device is returned to standby mode 202.

If result of the image data processing algorithm 216 indicates that an object of interest, e.g., a face, is present in the environment, the imaging sensor is operated in a depth mode 220. In depth mode, the light reflected by the environment is demodulated by the imaging sensor to generate signals indicative of depth in the environment (referred to here as depth data), e.g., signals indicative of a distance between the imaging sensor and each of various points in the environment.

The depth data are processed by one or more processors (222), such as processors of the mobile computing device, e.g., ASICs. The one or more processors perform an image recognition algorithm 224 based on the depth data. In the example of FIG. 2, the image recognition algorithm 224 is a facial recognition algorithm that determines whether an object in the environment is a recognized face. In some examples, the image recognition algorithm can process the depth data to recognize another type of object.

In some examples, if no object in the environment is recognized, the process returns to intensity mode 212 for one or more additional iterations 226, e.g., three iterations 226 in the example of FIG. 2. On the last (e.g., third) iteration, if no object is recognized, the low power presence detection mode 206 is resumed (as shown), or the mobile computing device is returned to standby mode 202. In some examples, the image recognition process proceeds for only a single iteration, and if no object is recognized, the depth mode stage 220 ends, e.g., low power presence detection mode 206 is resumed or the mobile computing device is returned to standby mode 202.

If the image recognition algorithm recognizes an object in the environment, the mobile device is unlocked 228.

Operation of the imaging sensor in depth mode is a power intensive process. By delaying the use of depth mode until intensity data indicate that an object, such as an object of interest, is present in the environment, power savings can be achieved, e.g., depth mode can be activated only in cases where an object of interest is or is likely to be present. The use of a low power presence detection prior to initiation of intensity mode operation can provide further power savings. Data processing for low power presence detection mode can be performed by processing circuitry of the 3D sensor system, rather than by one or more processors of the mobile device, and as such the presence detection data processing can consume significantly less power than either intensity mode or depth mode. By delaying the use of intensity mode until the presence of an object is indicated by low power detection mode, power savings can be achieved, e.g., intensity mode can be activated only in cases where an object is or is likely to be present.

In some examples, the imaging sensor can be operated in intensity mode and depth mode concurrently, e.g., for generation of intensity-enriched 3D representations of the environment. For instance, such intensity-enriched 3D representations can be useful for enhanced security in facial recognition processes.

In some examples, the light source of the 3D sensor system can be operable with low frequency modulation, e.g., for use in low light environments, such as in environments having a brightness below a threshold.

In some examples, the light source of the 3D sensor system can be disabled during intensity mode operation of the imaging sensor to provide further power savings.

The approaches described here can be implemented using any of a variety of pixel readout techniques. In some examples, all transfer gates of each pixel toggle substantially simultaneously, the photogenerated charge in the pixel is split among all sense nodes of the pixel, and a single ended readout path is employed. In these cases, the effective full well can be increased. In some cases, simultaneous toggling can result in higher noise levels. In some examples, only one transfer gate of each pixel toggles and the photogenerated charge in the pixel is transferred to a single sense node of the pixel. In these cases, a differential readout can be employed. Single-gate toggling can reduce noise and can result in at least partial cancellation of dark current.

Figure 3:
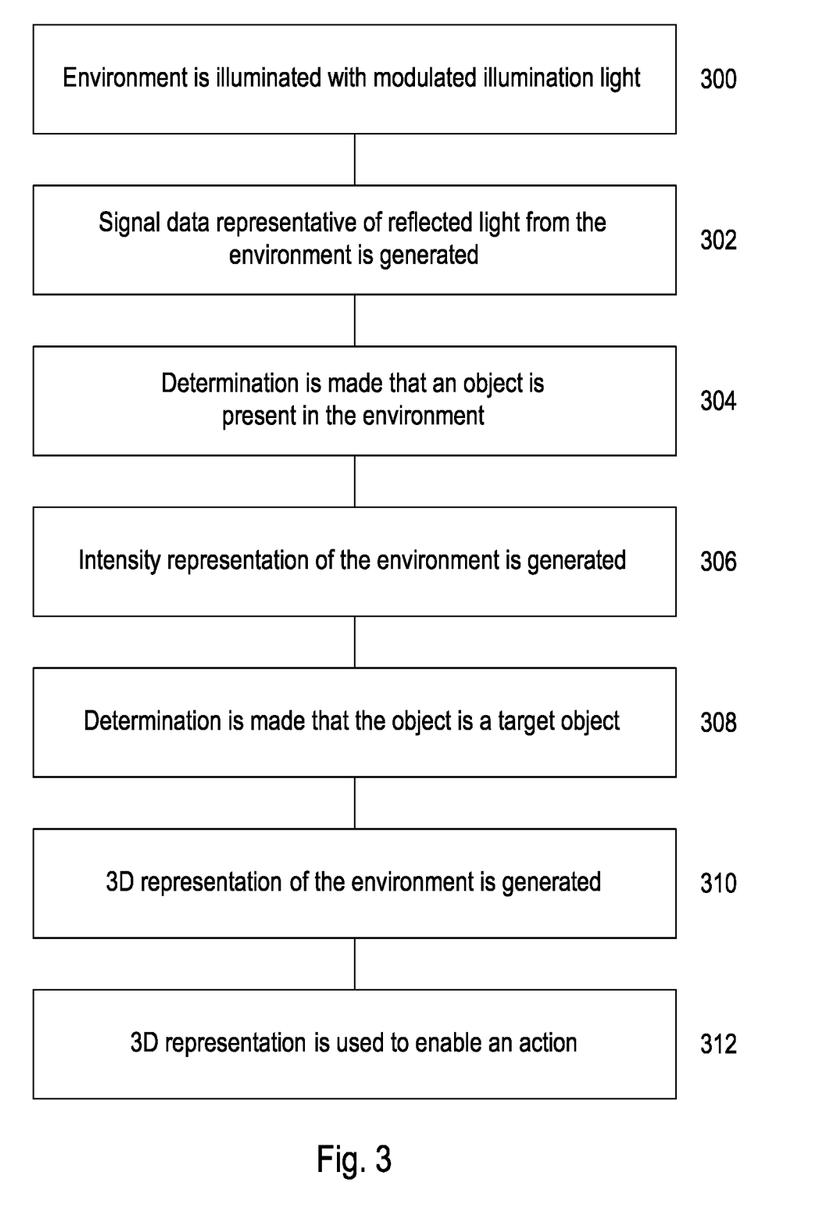
FIG. 3 is a flow chart.

Referring to FIG. 3, in an example approach to operating a time-of-flight sensor system, an environment is illuminated with modulated illumination light (300). Signal data representative of light reflected from the environment is generated by an array of pixels of a time-of-flight sensor of the time-of-flight sensor system (302).

A determination is made that an object is present in the environment (304), for instance, using a low power presence detection process. In some examples, the low power presence detection process can include generating low resolution image data based on the signal data representative of the reflected light, and determining that the low resolution image data indicate that an object is present in the environment.

An intensity representation of the environment of the sensor system is generated (306) based on the data representative of the reflected light. For instance, the intensity representation can be generated responsive to determining that an object is present in the environment.

A determination is made that the intensity representation indicates that an object in the environment is a target object (308), e.g., by performing an object recognition process.

Responsive to determining that an object in the environment is a target object, a 3D representation, e.g., an image, of the environment is generated based on the data representative of the reflected light (310), e.g., by demodulating the data representative of the reflected light. The 3D representation is used to enable an action (312), such as unlocking a mobile computing device. For instance, a facial recognition process can be performed to identify the target object as a recognized face, enabling the mobile computing device to be unlocked.

Figure 4:
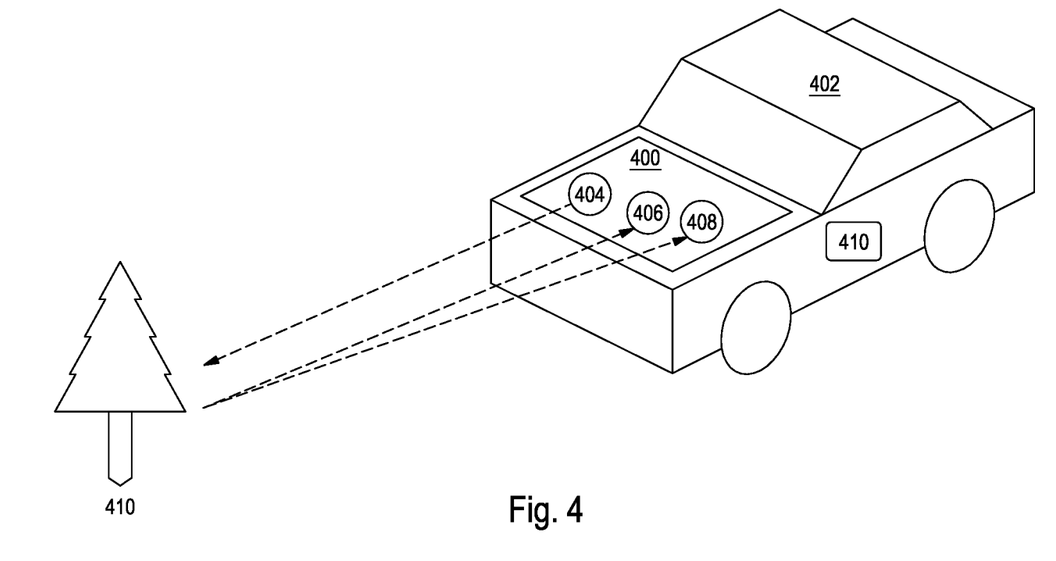
FIG. 4 is a diagram of a 3D sensor system integrated with a vehicle.

Referring to FIG. 4, in some examples, a 3D imaging system 400 employing ToF imaging sensors such as those described here can be incorporated into a vehicle 402, such as a partially-autonomous or fully-autonomous vehicle. The vehicle can be a land-based vehicle (as shown), such as a car or truck; an aerial vehicle, such as an unmanned aerial vehicle; or a water-based vehicle, such as a ship or submarine. The 3D imaging system 400 includes an illumination device 404 and imaging components including a camera 406 and a ToF imaging sensor 408. The 3D imaging system 400 can be used, e.g., for 3D mapping of the environment of the vehicle 402. For instance, the 3D imaging system 400 can be used to generate a 3D image of an object 410, e.g., an object in or near a roadway on which the vehicle 402. By determining the 3D shapes of various objects, a mapping of an environment of the vehicle can be determined and used to control the partially- or fully-autonomous operation of the vehicle 402, e.g., by a computing device 412 including one or more processors.

Figure 5A:
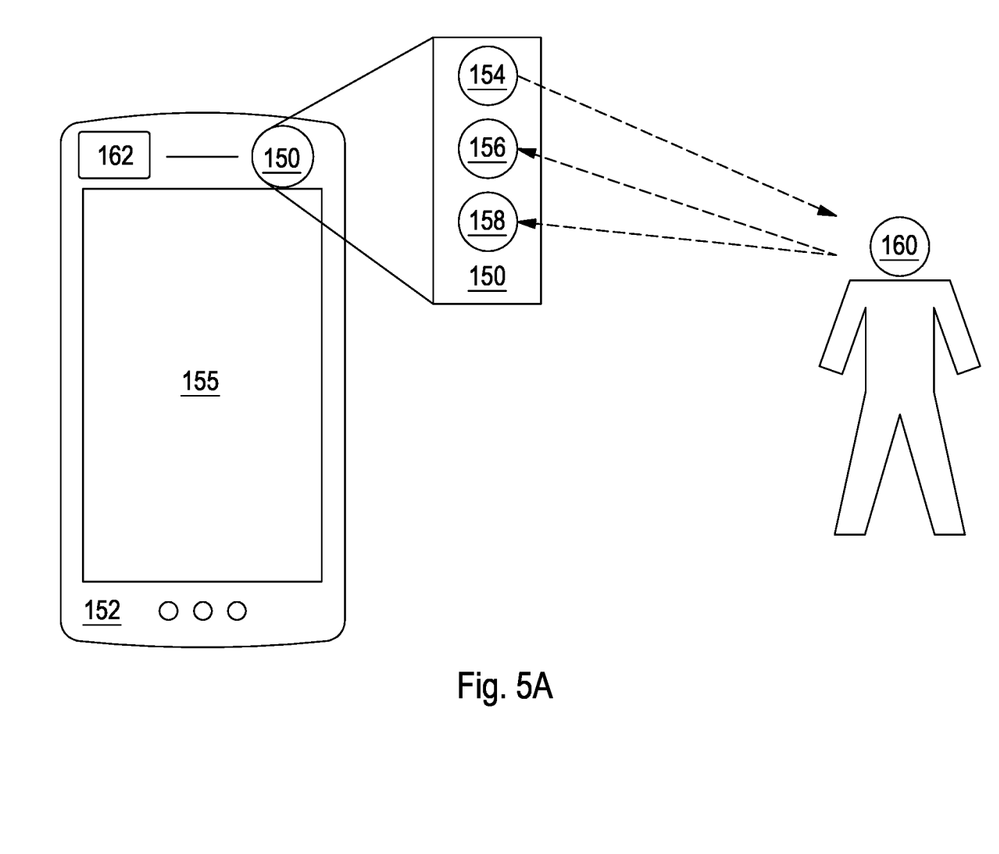
FIGS. 5A and 5B are diagrams of 3D sensor systems integrated with mobile devices.

Referring to FIG. 5A, in some examples, a 3D imaging system 150 employing ToF sensors such as those described here can be mounted on or incorporated into a front side of a mobile computing device 152, such as a mobile phone, a tablet, or a wearable computing device. The front side of the mobile device 152 is the side of the device that includes a screen 155. The 3D imaging system 100 can be a front-side imaging system that includes an illumination device 160 and imaging components including a camera 164 and a ToF imaging sensor 154. The front side 3D imaging system 150 can be used for 3D imaging applications, e.g., for facial recognition. For instance, the front side 3D imaging system 150 can be used to generate an image of the a user's face 160, e.g., for facial recognition processing, e.g., by one or more processors 162 of the mobile computing device 152.

Figure 5B:
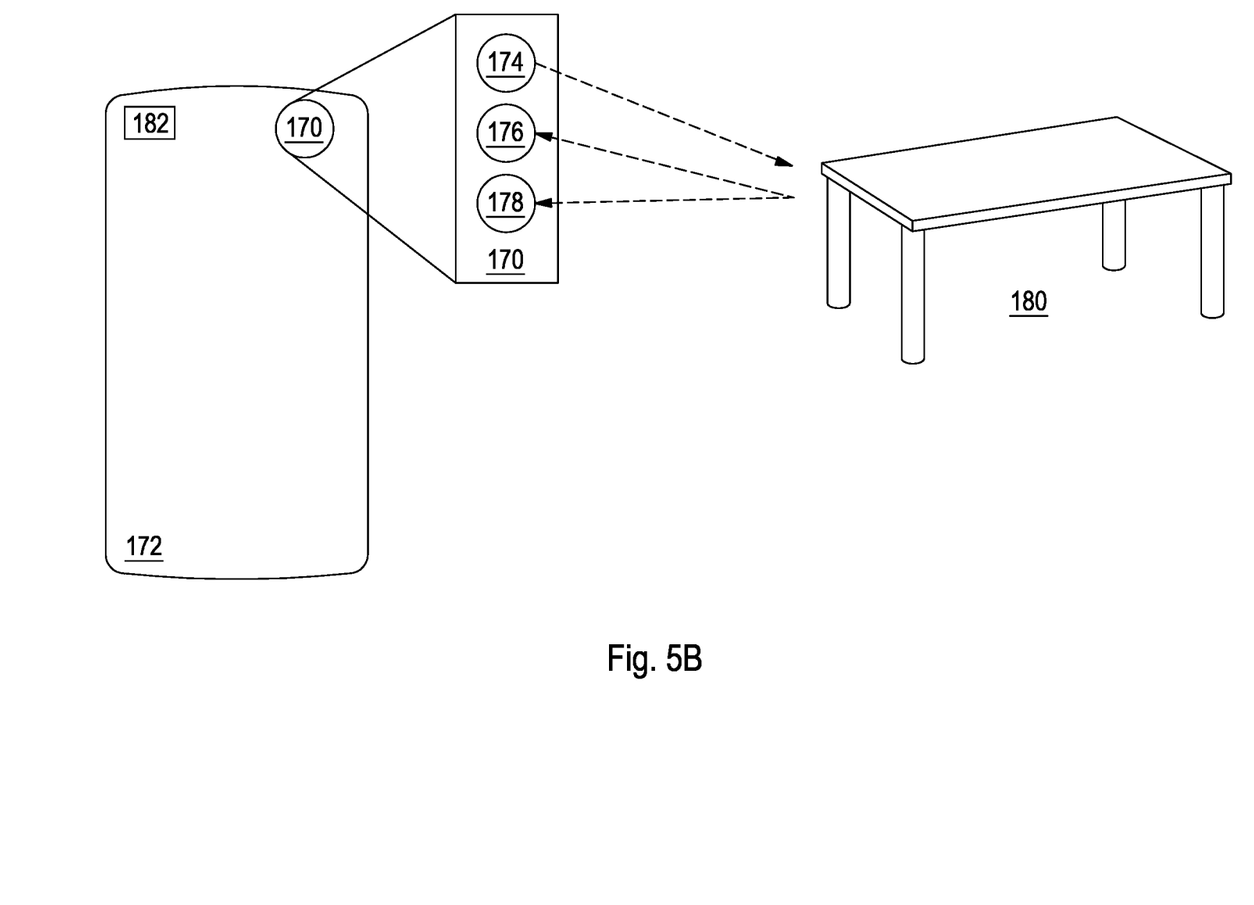

Referring to FIG. 5B, in some examples, a 3D imaging system 170 employing ToF sensors such as those described here can be mounted on a back side of a mobile computing device 172. The back side is the side of the device opposite the front side, such as the side that does not include a screen. The 3D sensor system 170 can be a back-side imaging system that includes an illumination device 180 and imaging components including a camera 184 and a ToF sensor 174. The back-side 3D sensor system 170 can be used, e.g., for object recognition or for environmental mapping, such as mapping of a room 180, e.g., by one or more processors 182.

3D imaging systems employing ToF sensors such as those described here can be incorporated into other devices, including game consoles, distance measuring devices, surveillance devices, and other devices.

A number of embodiments of the invention have been described. Nevertheless, it will be understood that various modifications may be made without departing from the spirit and scope of the invention. Accordingly, other embodiments are within the scope of the following claims.

What is claimed is:

1. A method for operating a time-of-flight sensor system, the method comprising:
   generating signal data representative of reflected light from an environment; wherein the generating signal data occurs by an array of pixels of a time-of-flight sensor of the time-of-flight sensor system;

generating an intensity representation of an object in the environment based on the signal data representative of the reflected light from the environment;

determining that the intensity representation indicates that an object in the environment comprises a target object; and generating a three-dimensional representation of the environment based on the indication of the target object being present in the environment.

2. The method according to claim 1, wherein generating the three-dimensional representation of the environment comprises demodulating the data representative of the reflected light.

3. The method according to claim 1, wherein the generation of the intensity representation of the environment uses less power than the generation of the three-dimensional representation of the environment.

4. The method according to claim 1, comprising, by processing circuitry of the time-of-flight sensor, determining that an object is present in the environment.

5. The method according to claim 4, comprising generating the intensity representation responsive to determining that an object is present in the environment.

6. The method according to claim 4, wherein the signal data comprises first image data having a first resolution, and wherein determining that an object is present in the environment comprises: generating a second image data based on the first image data, the second image data having a second resolution higher than the first resolution;

and determining that the second image data indicates that an object is present in the environment.

7. The method according to claim 1, wherein generating an intensity representation comprises generating a two-dimensional representation of the environment.

8. The method according to claim 1, wherein determining that the intensity representation indicates that the object comprises the target object comprises performing an object recognition process.

9. The method according to claim 1, comprising illuminating the environment with modulated illumination light.

10. The method according to claim 9, wherein when the environment has a light level below a threshold, comprising illuminating the environment with light of low frequency modulation.

11. The method according to claim 9, comprising synchronizing the operation of the time-of-flight sensor with the modulation of the illumination light.

12. A time-of-flight sensor system comprising:

an time-of-flight sensor comprising an array of pixels configured to generate signal data representative of reflected light from an environment, and one or more processors configured to:

generate an intensity representation of an object in the environment based on the signal data representative of the reflected light from the environment, determine that the intensity representation indicates that the object is present in the environment comprises a target object; and generate a three-dimensional representation of the environment based on the indication of the target object being present in the environment.

13. The system according to claim 12, comprising an illumination device configured to illuminate the environment with modulated illumination light.

14. The system according to claim 13, comprising an illumination driver configured to control operation of the illumination device.

15. The system according to claim 12, wherein generating an intensity representation comprises generating a two-dimensional representation of the environment.

16. The system according to claim 15, wherein the signal data comprise first image data having a first resolution, and comprising processing circuitry of the time-of-flight sensor, the processing circuitry being configured to:

generate second image data based on the first image data, the second image data having a second resolution higher than the first resolution; and determine that the second image data indicates that an object is present in the environment.

17. A mobile device comprising the system according to claim 12.

18. A vehicle comprising the system according to claim 12.

* * * * *